(12) United States Patent
Roychowdhury et al.

(10) Patent No.: US 10,983,505 B2
(45) Date of Patent: Apr. 20, 2021

(54) SCAN PATH CORRECTION FOR MOVEMENTS ASSOCIATED WITH AN ADDITIVE MANUFACTURING MACHINE

(71) Applicant: General Electric Company, Schenectady, NY (US)

(72) Inventors: Subhrajit Roychowdhury, Niskayuna, NY (US); Brian McCarthy, Niskayuna, NY (US); Michael Tucker, Niskayuna, NY (US); David C Bogdan, Jr., Charlton, NY (US); Michael Evans Graham, Slingerlands, NY (US); William Carter, Galway, NY (US); Victor Ostroverkhov, Ballston Lake, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 147 days.

(21) Appl. No.: 15/824,206

(22) Filed: Nov. 28, 2017

(65) Prior Publication Data

US 2019/0163167 A1     May 30, 2019

(51) Int. Cl.
*G05B 19/4099*     (2006.01)
*B33Y 50/02*        (2015.01)

(52) U.S. Cl.
CPC .......... *G05B 19/4099* (2013.01); *B33Y 50/02* (2014.12); *G05B 2219/49007* (2013.01)

(58) Field of Classification Search
CPC ........ B29C 64/241; G05B 2219/43137; G05B 19/4099; G05B 2219/49007; B33Y 50/02
See application file for complete search history.

(56) References Cited

U.S. PATENT DOCUMENTS

| 8,172,562 B2 | 5/2012 | Mattes |
| 8,944,802 B2 | 2/2015 | Patterson et al. |

(Continued)

FOREIGN PATENT DOCUMENTS

| WO | WO2014/195068 A1 | 12/2014 |
| WO | 2017035217 A1 | 3/2017 |

OTHER PUBLICATIONS

Egan, M.J. "Spiral Growth Manufacture : A Continuous Additive Manufacturing Technology for Powder Processing", Department of Engineering, The University of Liverpool, 2007, 98pgs, (Part 1 of 3).

(Continued)

*Primary Examiner* — Mohammad Ali
*Assistant Examiner* — Vincent W Chang
(74) *Attorney, Agent, or Firm* — Dority & Manning, P.A.

(57) ABSTRACT

Some embodiments facilitate creation of an industrial asset item via an additive manufacturing process wherein motion is provided between a build plate and a print arm. A correction engine may receive, from an industrial asset item definition data store containing at least one electronic record defining the industrial asset item, the data defining the industrial asset item. A correction engine computer processor may then correct the motion provided between the build plate and the print arm such that the motion deviates from a path indicated by the data defining the industrial asset item. The three-dimension printer may be a rotary printer such that the build plate rotates about a vertical axis and moves along the vertical axis during printing. In these cases, a pre-compensation algorithm may be applied to correct the motion provided between the build plate and the print arm before transmitting data to the three-dimensional additive manufacturing printer.

21 Claims, 20 Drawing Sheets

(56) References Cited

U.S. PATENT DOCUMENTS

| | | | |
|---|---|---|---|
| 9,321,215 B2 | 4/2016 | Dudley | |
| 9,849,631 B1* | 12/2017 | Goss | B29C 64/241 |
| 2014/0129022 A1 | 5/2014 | Briscella et al. | |
| 2014/0172148 A1* | 6/2014 | Miller | G05B 19/414 |
| | | | 700/183 |
| 2014/0191439 A1 | 7/2014 | Davis | |
| 2014/0265034 A1 | 9/2014 | Dudley | |
| 2016/0096319 A1* | 4/2016 | Donaldson | B29C 64/106 |
| | | | 264/40.7 |
| 2016/0167303 A1 | 6/2016 | Petelet | |
| 2016/0243762 A1* | 8/2016 | Fleming | H05K 3/0014 |
| 2016/0263832 A1 | 9/2016 | Bui et al. | |
| 2016/0368050 A1 | 12/2016 | Morris et al. | |
| 2017/0050381 A1 | 2/2017 | Minardi et al. | |
| 2017/0151715 A1 | 6/2017 | Voris et al. | |
| 2017/0232680 A1* | 8/2017 | Skogsrud | G05B 19/4099 |
| | | | 425/140 |
| 2017/0259502 A1 | 9/2017 | Chapiro et al. | |
| 2017/0291841 A1* | 10/2017 | Inamura | B33Y 10/00 |
| 2017/0297106 A1 | 10/2017 | Myerberg et al. | |
| 2018/0085995 A1* | 3/2018 | Davis | B29C 41/22 |
| 2018/0275636 A1* | 9/2018 | Zhao | G05B 19/4099 |

OTHER PUBLICATIONS

Egan, M.J. "Spiral Growth Manufacture : A Continuous Additive Manufacturing Technology for Powder Processing", Department of Engineering, The University of Liverpool, 2007, 98pgs, Chapter 3, (Part 2 of 3).

Egan, M.J. "Spiral Growth Manufacture : A Continuous Additive Manufacturing Technology for Powder Processing", Department of Engineering, The University of Liverpool, 2007, 97pgs, Chapter 6, (Part 3 of 3).

Hauser, C. et al., "Spiral Growth Manufacturing (SGM)—A Continuous Additive Manufacturing Technology for Processing Metal Powder by Selective Laser Melting", 2005, pp. 1-17.

International Search Report Corresponding to Application No. PCT/US2018/050559 dated Jan. 10, 2019.

International Search Report Corresponding to Application No. PCT/US2018/060693 dated Feb. 15, 2019.

* cited by examiner

| DESIGN IDENTIFIER 1902 | ITEM DESCRIPTION 1904 | FRAME IDENTIFIER 1906 | HEIGHT 1908 | ANGULAR WIDTH 1910 | CORRECTED SCAN PATH 1912 |
|---|---|---|---|---|---|
| D_101 | BRACKET | F_101 | 1 μ | 1.5° | |
| D_101 | BRACKET | F_102 | 1 μ | 1.5° | |
| D_101 | BRACKET | F_103 | 1 μ | 1.5° | |

SCAN PATH CORRECTION FOR MOVEMENTS ASSOCIATED WITH AN ADDITIVE MANUFACTURING MACHINE

BACKGROUND

Some embodiments disclosed herein relate to industrial assets and, more particularly, to systems and methods associated with scan path correction for an additive manufacturing machine.

An additive manufacturing machine, such as a three-dimensional printer, may utilize motion between a build plate (e.g., a platform on which the item being printed is formed) and a print arm (e.g., including a laser that provides energy to transform a powder or other substance into the item). By ways of example, either the build plate or print arm, or both, might be moved with respect to each other. The positions of the build plate over time with respect to the print arm, or "scan path," may be defined or create from a digital representation (e.g., a three-dimensional model) of the item.

In some cases, however, the motion associated with the manufacturing process may introduce errors into the position of a build plate relative to a print arm. For example, a "rotary" additive manufacturing machine may rotate a build plate as a print arm moves over the build plate in a two-dimensional pattern. Note that the rotation will cause locations near the center of the build plate to move more slowly as compared to locations near the outer perimeter of the build plate (e.g., away from the center). A scan path that does not take this factor into account may introduce errors into the creation of the item. Note that such errors may be associated with the dimensions and/or shape of the item (e.g., large errors) or can change the velocity of the of a laser spot with respect to the powder bed and thereby change the energy delivered to the powder bed (thus altering the material properties and introducing small errors). It would therefore be desirable to efficiently and accurately facilitate creation of an item via an additive manufacturing process by correcting motion between a build plate and a print arm.

SUMMARY

Some embodiments facilitate creation of an industrial asset item via an additive manufacturing process wherein motion is provided between a build plate and a print arm. A correction engine may receive, from an industrial asset item definition data store containing at least one electronic record defining the industrial asset item, the data defining the industrial asset item. A correction engine computer processor may then correct the motion provided between the build plate and the print arm such that the motion deviates from a path indicated by the data defining the industrial asset item. The three-dimension printer may be a rotary printer such that the build plate rotates about a vertical axis and moves along the vertical axis during printing. In these cases, a pre-compensation algorithm may be applied to correct the motion provided between the build plate and the print arm before transmitting data to the three-dimensional additive manufacturing printer.

Some embodiments comprise: means for receiving, at a correction engine from an industrial asset item definition data store containing at least one electronic record defining the industrial asset item, the data defining the industrial asset item; and means for correcting, by a correction engine computer processor, the motion provided between the build plate and the print arm such that the motion deviates from a path indicated by the data defining the industrial asset item.

Technical effects of some embodiments of the invention are improved and computerized ways to efficiently and accurately facilitate creation of an item via an additive manufacturing process by correcting motion between a build plate and a print arm. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 19 is a tabular portion of an approximate helical slices database in accordance with some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1B:
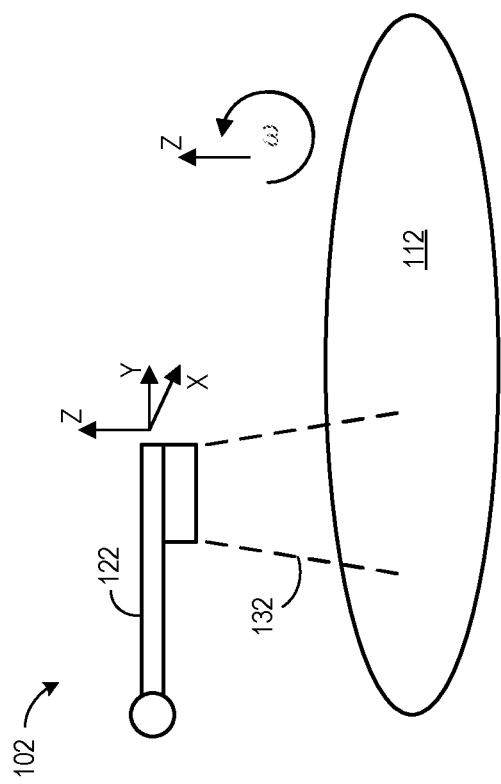
FIGS. 1A and 1B illustrate examples of additive manufacturing devices having motion between a build plate and a print arm.
Figure 1A:
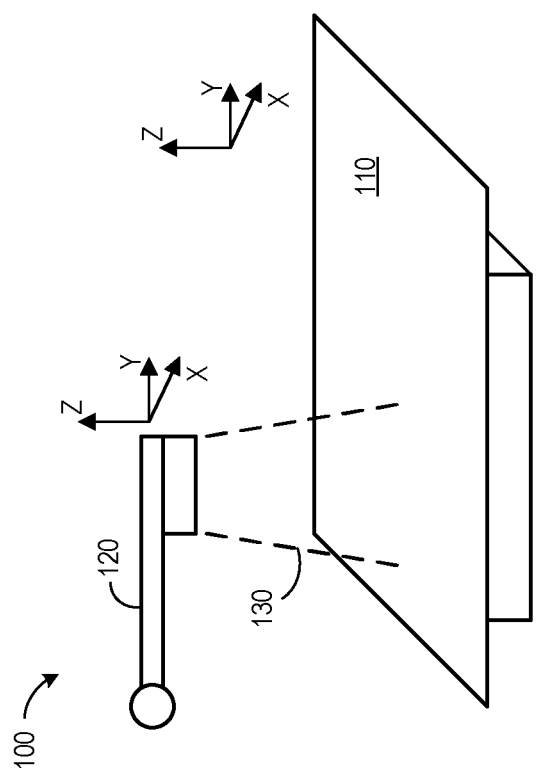

Traditionally, an additive manufacturing process may create parts in a linear fashion. That is, the parts may be sliced into a set of layers at a pre-determined (often equally spaced) heights, each of which may then be built sequentially by moving a laser beam in a pre-designed two-dimensional trajectory (the "scan path"). FIGS. 1A and 1B illustrate examples of additive manufacturing devices having motion between a build plate and a print arm. In the example 100 of FIG. 1A, a build plate 110 or platform may move linearly in any of three different directions (x, y, and z as illustrated in FIG. 1A). A print arm 120 may also move linearly in any of three different directions (x, y, z). As a result of either (or both) of these motions, a field-of-view 130 associated with a laser of the print arm 120 may move to different locations of the built plate 110 to create a three-dimensional industrial asset item.

According to some embodiments, creation of an industrial asset item may be facilitated via a "rotary" additive manufacturing process. For example, as illustrated by the example 102 of FIG. 1B, a build plate 112 may rotate (ω) about a vertical axis (z axis) and move, relative to a print arm 122, along the vertical axis during printing. In some cases, the build plate 112 might be lowered with respect to the print arm 122, the print arm 122 might be raised with respect to the build plate 112, etc. As a result of either (or both) of these motions, a field of view 132 associated with a laser of the print arm 122 may move to different locations of the build plate 112 to create a three-dimensional industrial asset item. Note two improvements that may be associated with rotary machines as compared to linear counterparts include decreasing (or even eliminating) scanner idle time (increasing throughput as a result) and better space utilization for parts having certain shapes.

In some cases, the motion between a build plate and a print arm may introduce errors into a scan path. FIG. 1 is a high-level diagram of a system 200 to reduce such errors according to some embodiments. The system 200 includes an additive manufacturing system 250 that executes a correction engine 255. According to some embodiments, the correction engine 255 can access an item definition data store 220 that includes electronic records defining an industrial asset item (e.g., Computer Aided Design ("CAD") files). Note that the additive manufacturing system 250 could be completely de-centralized and/or might be associated with a third party, such as a vendor that performs a service for an enterprise.

The additive manufacturing system 250 and/or other elements of the system might be, for example, associated with a Personal Computer ("PC"), laptop computer, a tablet computer, a smartphone, an enterprise server, a server farm, and/or a database or similar storage devices. According to some embodiments, an "automated" correction engine 255 may access and utilize frames 410 defining an industrial asset item that may then be stored (e.g., back into the item definition data store 220) and/or adjusted and transmitted to a three-dimensional printer 260. As used herein, the term "automated" may refer to, for example, actions that can be performed with little (or no) intervention by a human.

As used herein, devices, including those associated with the additive manufacturing system 250 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

Figure 2:
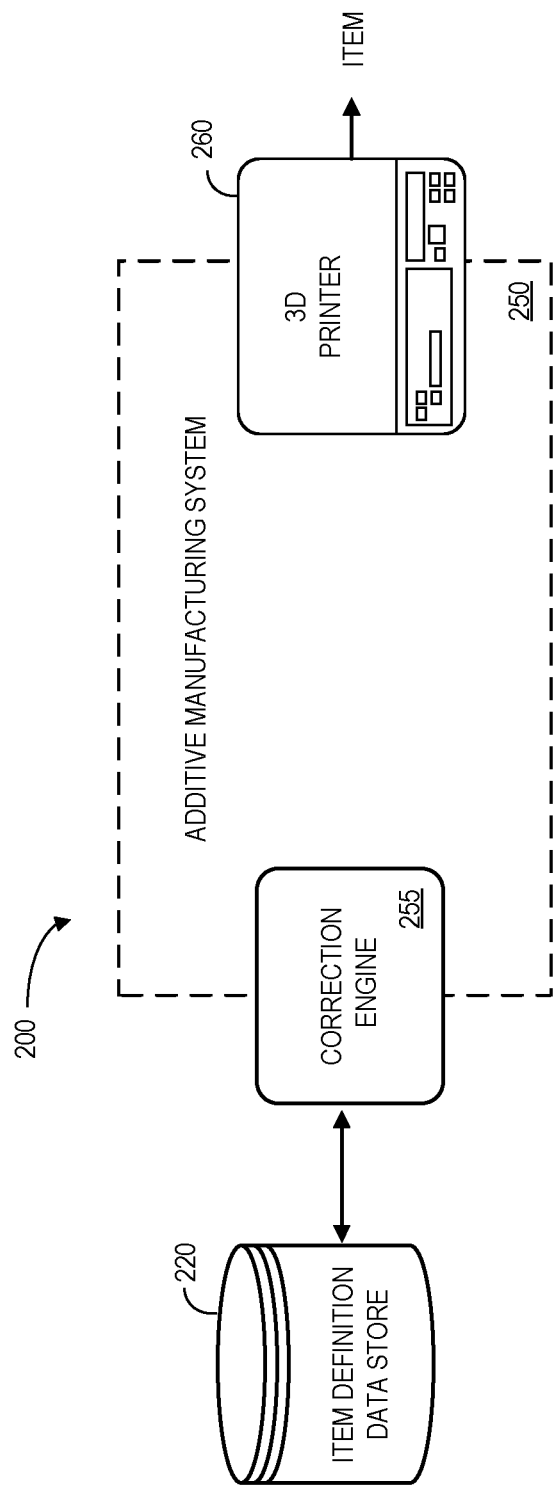
FIG. 2 is a high-level diagram of a system according to some embodiments.

The additive manufacturing system 250 may store information into and/or retrieve information from data stores, including the item definition data store 220. The data stores might, for example, store electronic records representing item designs, three-dimensional printer information, etc. The data stores may be locally stored or reside remote from the additive manufacturing system 250. Although a single additive manufacturing system 250 is shown in FIG. 2, any number of such devices may be included. Moreover, various devices described herein might be combined according to embodiments of the present invention. For example, in some embodiments, the correction engine 255, item definition data store 220, and/or other devices might be co-located and/or may comprise a single apparatus.

Figure 3:
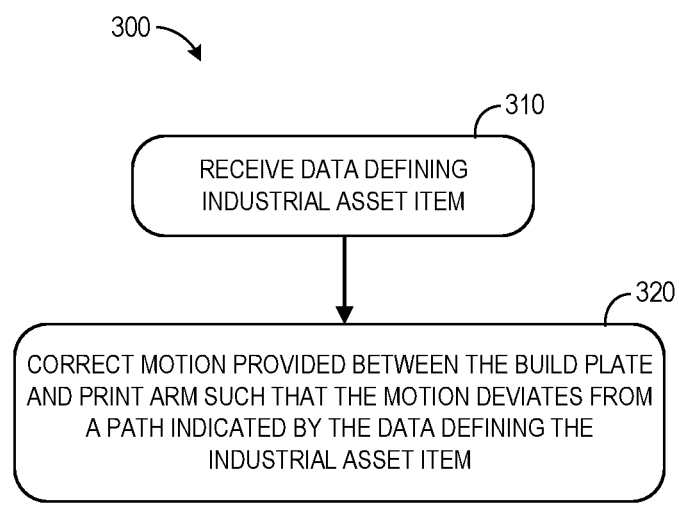
FIG. 3 is a method that may be associated with an additive manufacturing system in accordance with some embodiments.

Note that the system 200 of FIG. 2 is provided only as an example, and embodiments may be associated with additional elements or components. According to some embodiments, the elements of the system 200 automatically facilitate creation of an item via an additive manufacturing process by correcting motion between a build plate and a print arm. For example, FIG. 3 illustrates a method 300 that might be performed according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At 310, the system may receive data defining the industrial asset item. For example, the information might be received from an industrial asset item definition data store containing at least one electronic record defining the industrial asset item. The at least one electronic record defining the industrial asset item might be associated with, for example, an image, a manufactured design, a cross-section, a binary CAD file, a geometry file, etc.

The method 300 of FIG. 3 may be associated with an additive manufacturing process wherein motion is provided between a build plate and a print arm. For example, the build plate may be moved relative to the print head (which remains stationary) or the print head may be moved relative to the build plate (which remains stationary). In some embodiments, both the print head and the build plate are simultaneously moved relative to each other.

At 320, a correction engine may automatically correct the motion provided between the build plate and the print arm such that the motion deviates from a path indicated by the data defining the industrial asset item. That is, the scan path of an item in an item definition data store (as defined, for example, in a sequence of frames) may be adjusted to correct for errors. For example, when the provided motions of the build plate and print arm are linear, at least one of the linear motions may be damped such that an associated position over time is generally sinusoidal (e.g., as if the build plate or print arm were anchored to a spring). Such an approach may help reduce errors and/or strain introduced by abrupt changes in velocity during printing. According to some embodiments, a three-dimensional printer is associated with a working scan field and at least one frame of the item definition file is created based on the working scan field. Moreover, note that embodiments may be associated with a three-dimensional printer utilizing any additive printing technique, including a Direct Metal Laser Melting ("DMLM") process.

Figure 4:
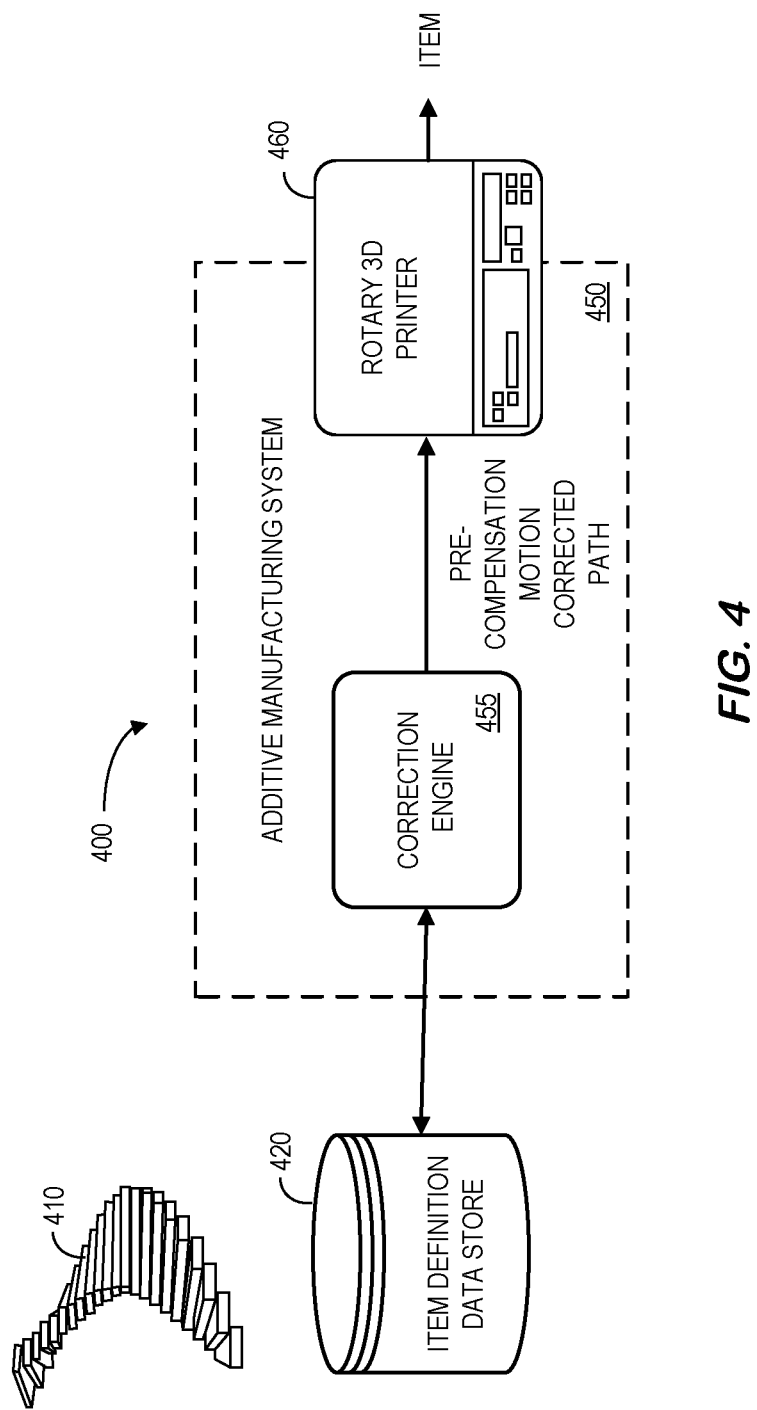
FIG. 4 is a high-level diagram of a system that may apply pre-compensation according to some embodiments.

According to some embodiments, a correction engine may calculate correction adjustments before printing begins based on the known movement characteristics of a particular three-dimensional printing technique. For example, FIG. 4 is a high-level diagram of a system 400 that may apply such a pre-compensation according to some embodiments. As before, the system 400 includes an additive manufacturing system 450 that executes a correction engine 455. According to some embodiments, the correction engine 455 can access an item definition data store 420 that includes electronic records defining an industrial asset item (e.g., CAD files). According to some embodiments, an automated correction engine 455 may access and utilize frames 410 defining an industrial asset item that may then be stored (e.g., back into the item definition data store 420) and/or adjusted and later transmitted to a rotary three-dimensional printer 460.

Figure 5:
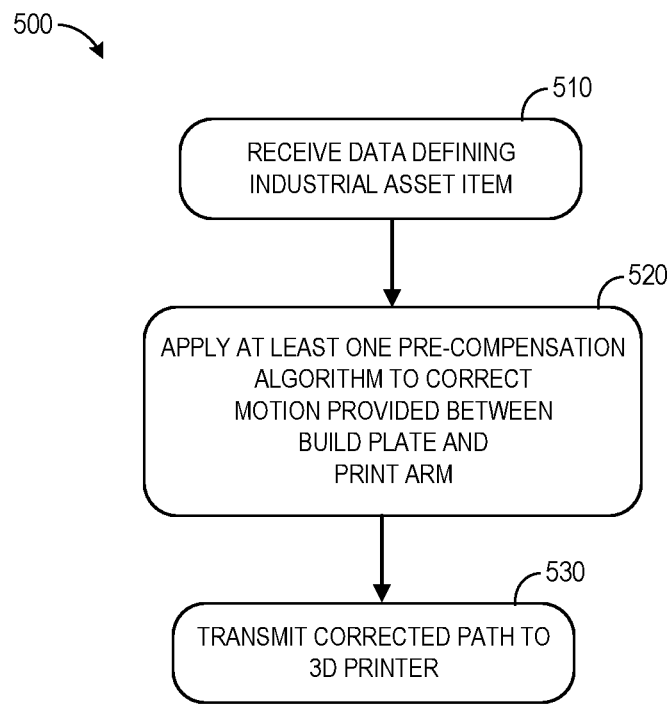
FIG. 5 is a method that may apply pre-compensation for an additive manufacturing system in accordance with some embodiments.

Note that the system 400 of FIG. 4 is provided only as an example, and embodiments may be associated with additional elements or components. According to some embodiments, the elements of the system 400 automatically facilitate creation of an item via a rotary additive manufacturing process (e.g., such that a build plate rotates about a vertical axis and moves, relative to a print arm, along the vertical axis during printing) by applying pre-compensation to correct motion between the build plate and print arm. For example, FIG. 5 illustrates a method 500 that might be performed according to some embodiments of the present invention.

At 510, the system may receive data defining an industrial asset item (e.g., as frames of a helical slice arranged as a spiral staircase). At 520, a correction engine may apply at least one pre-compensation algorithm to correct the motion provided between the build plate and the print arm before transmitting data to a three-dimensional additive manufacturing printer at 530. The pre-compensation algorithm might be associated with, for example, an intended scan velocity, motion of an instantaneous laser spot position, an actual scan velocity, a velocity compensation, etc. According to some embodiments, the pre-compensation algorithm provides multi-point compensation resulting in a variable velocity polyline for an individual hatch as described in connection with FIG. 10.

Note that when a build plate of a rotary machine continuously rotates and drops down simultaneously (a downward spiral motion), it may not be feasible to slice a part into horizontal layers as is done for traditional machines. According to some embodiments, a is instead created in a continuous helical slice (as opposed to building it up from a collection of stacked horizontal slices). An advantage of slicing in this fashion may be that the build occurs substantially continuously without waiting for powder dispense and recoat between layers, and, as a result, laser/scanner utilization (and throughput) may be increased. Some embodiments approximate a helical slice with a collection of locally linear frames that can be built sequentially within practical error tolerances. Although embodiments may be associated with a single laser system, the approaches described herein may be extended to multiple lasers (e.g., by adjusting a downward speed of the platform to increase throughput).

The helical slice may be sub-divided into a collection of overlapping steps or frames. According to some embodiments, the helical slice may be approximated by a collection of overlapping frames each of which is oriented normally to the axis of the cylinder. According to some embodiments, each step or frame is scanned sequentially. Moreover, each frame might be associated with a particular height $\Delta h$. Note that for a uniform section of the geometry in the z direction (vertical), the system may increase stair step height to reduce computational cost. This might be possible, for example, when the geometry contained within the frames will not change significantly. Consider, for example, a hollow cylinder. The geometry contained within the frames may be exactly identical. In this case, the system may just generate the scan path for the first frame and repeat it until it is determined that a hatch angle should be adjusted. Even at that point, the system does not need to compute the geometric boundary contained within the frame. This represents increasing the step height with a much wider horizontal section.

Figure 6:
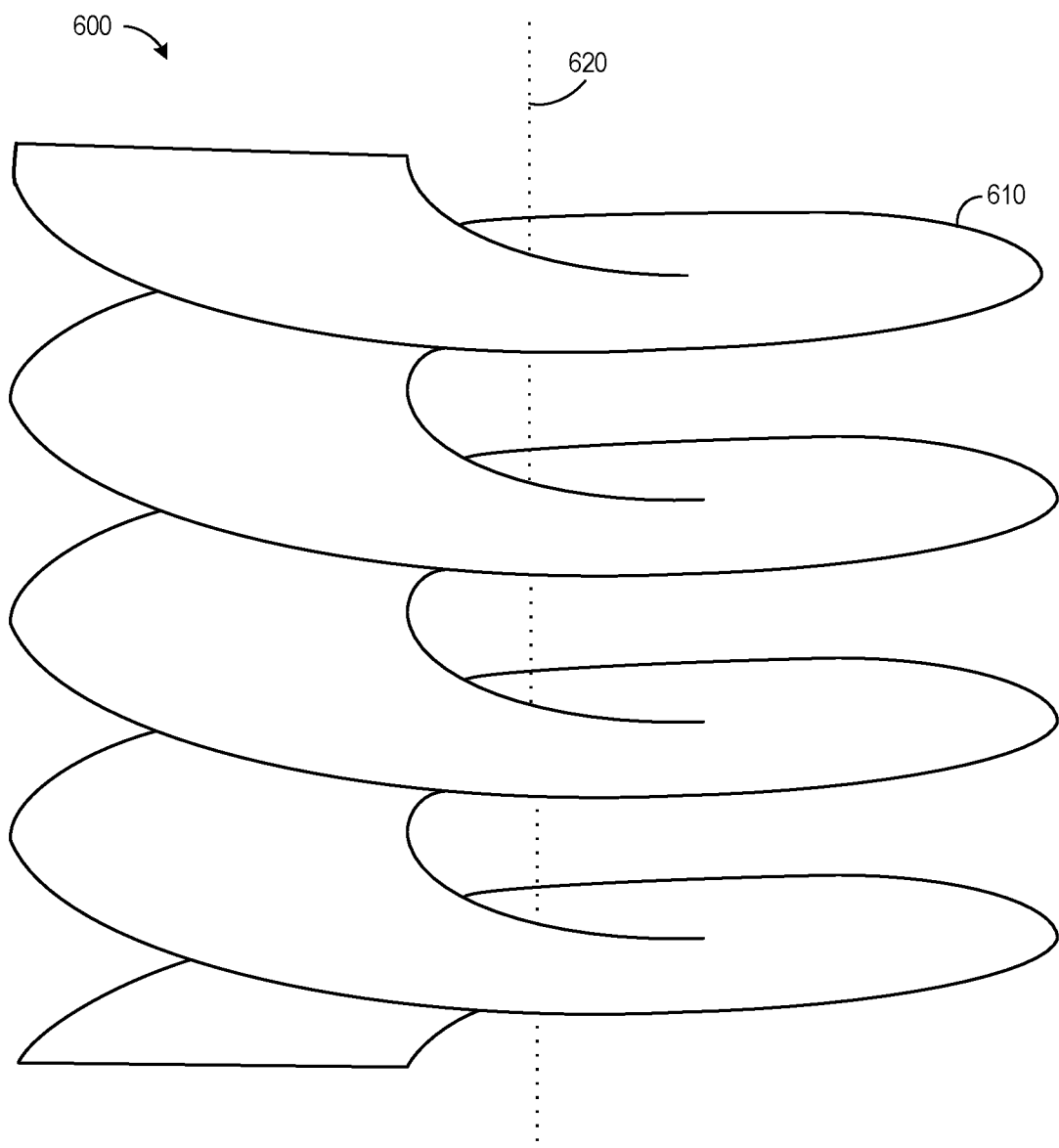
FIG. 6 is an illustration of a helical slice for a single-laser rotary additive manufacture process.
Figure 7:
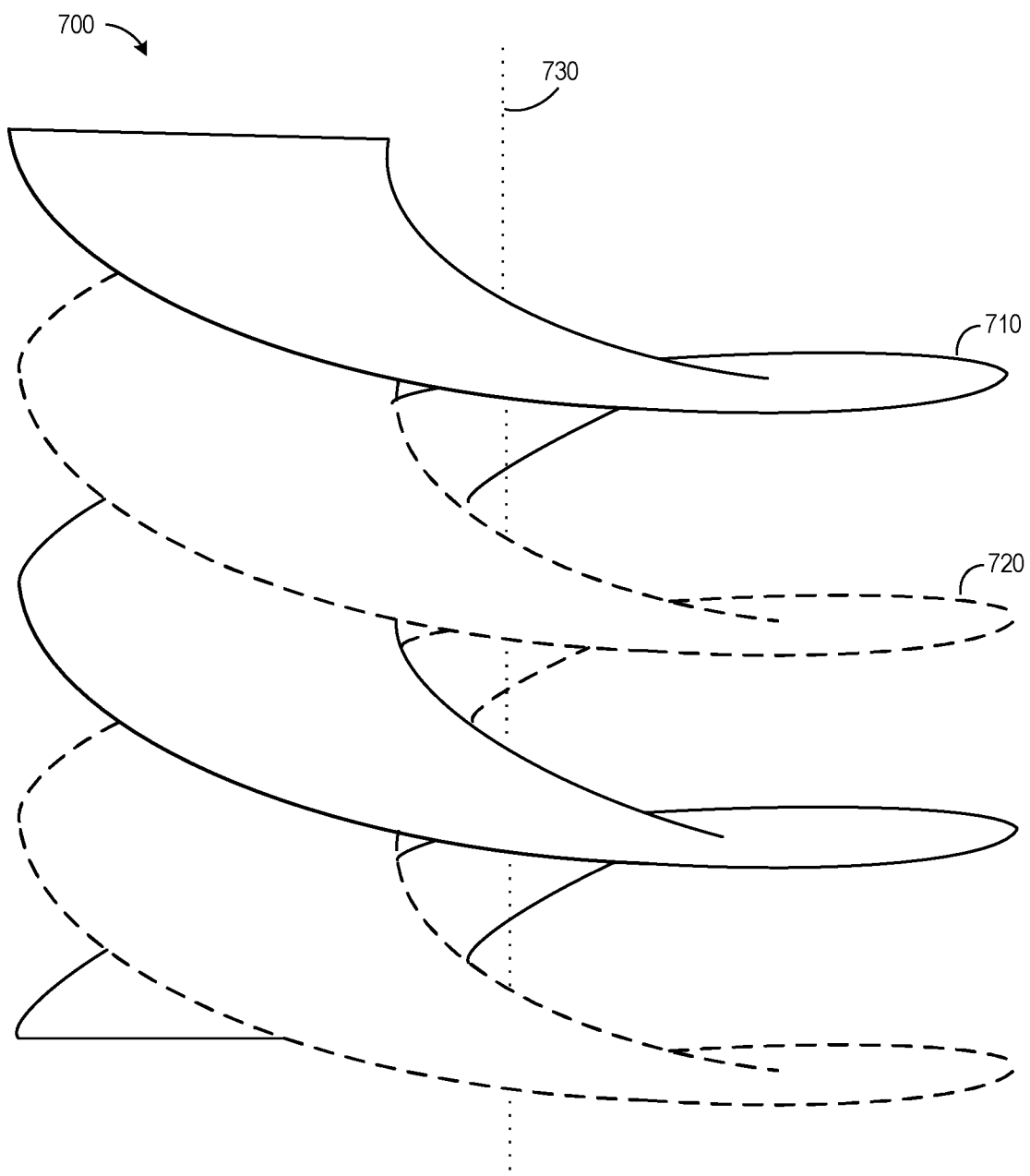
FIG. 7 is an illustration of helical slices for a two-laser rotary additive manufacture process.

FIG. 6 is an illustration 600 of a helical slice 610 for a single-laser rotary additive manufacture process. The slice 610 might represent, for example, vertical movement of a build plate combined with a simultaneous rotation about an axis 620. Note that the techniques described herein are by no means limited to cylinders, and that any arbitrary shape may be sliced according to embodiments. Moreover, note that embodiments may be associated with systems having more than one print arm or laser. For example, FIG. 7 is an illustration 700 of helical slices 710, 720 for a two-laser rotary additive manufacture process. One slice 710 (illustrated with a solid line in FIG. 7) might be associated with one print arm while the other slice 720 (illustrated with a dashed line in FIG. 7) is associated with the other print arm. The two slices 710, 720 may, according to some embodiments, be intertwined.

Figure 8:
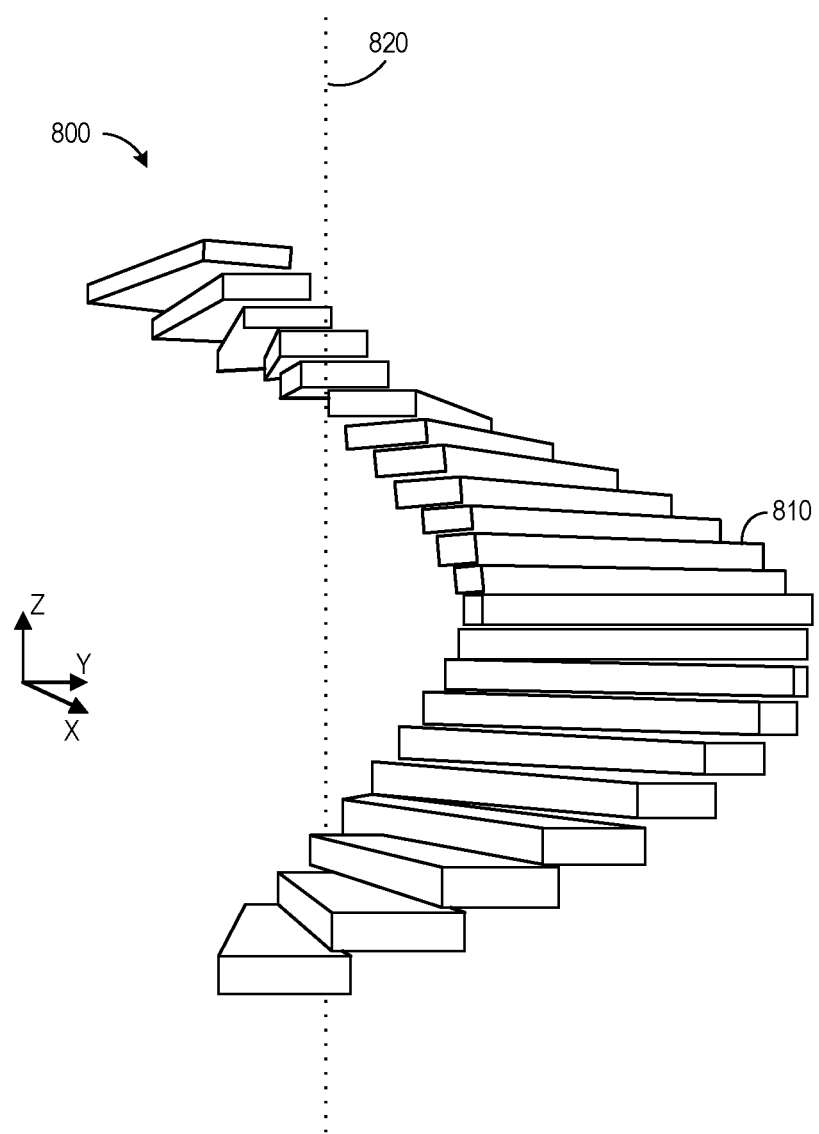
FIG. 8 illustrates a "spiral staircase" approximation of a helical slice for an additive manufacturing process according to some embodiments.

According to some embodiments, the system may slice data defining an industrial asset item to create a series of two-dimensional, locally linear frames helically arranged as a "spiral staircase" of steps. For example, FIG. 8 illustrates a "spiral staircase" approximation 800 of a helical slice for an additive manufacturing process according to some embodiments. The staircase 800 is comprised of a series of two-dimensional steps 810, with each step being oriented normal to a vertical axis 820 (in the "Z" direction). Note that the staircase is two-dimensional slicing and scanning strategy (as opposed to a three-dimensional approach). Note that as used herein, the phrase "spiral staircase" might refer to a series of frames that include at least some overlapping neighboring frames and/or at least some frames having a gap or space between a neighboring frame. Moreover, embodiments might be associated with frames with different radial dimensions, frames having "radial edges" that are not actually radial, frames having "circumferential edges" that are not actually circumferential, etc. Moreover, embodiments may be associated with a spiral staircase including both: (i) a series of inner frames or steps, and (ii) a series of outer frames or steps each at the same Z position as a corresponding inner step. The inner and outer steps might represent stair step in two more pieces (which might be divided arbitrarily).

Figure 9:
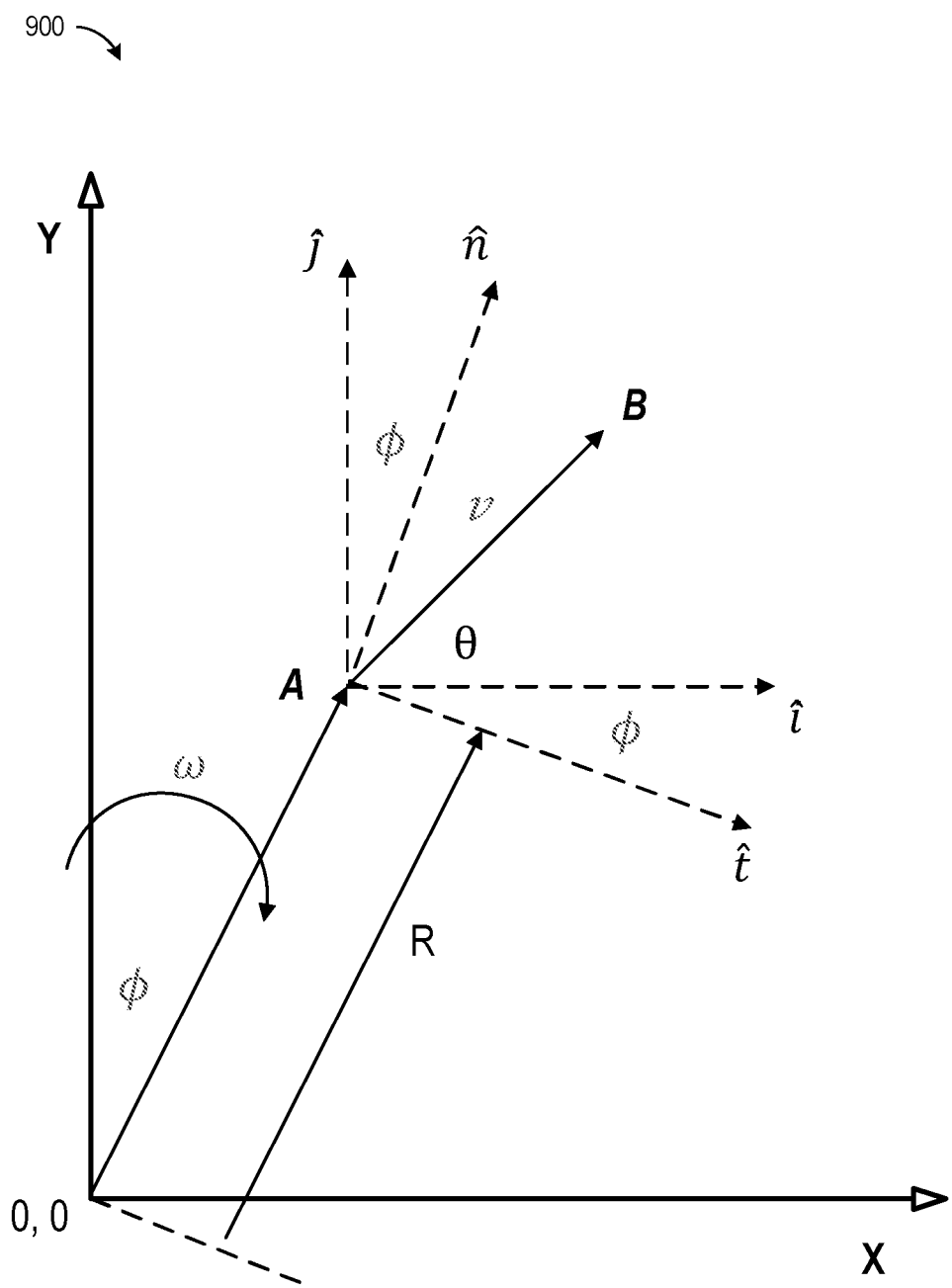
FIG. 9 illustrates use of pre-compensation for predictable movement in accordance with some embodiments.

FIG. 9 illustrates 900 use of pre-compensation for predictable movement in accordance with some embodiments (with A representing an instantaneous spot position, AB being an intended scan line, and θ being the intended hatch angle). The illustration 900 might, for example, be applicable to correct a scan path when outer portions of a rotating build plate (ω) move faster as compared to inner portions. Note that an intended scan velocity may be represented by:

$$v = v(\cos\theta \hat{i} + \sin\theta \hat{j})$$

while the motion of the instantaneous laser spot position may be represented by the following equation:

$$\frac{dR}{dt} = v\sin(\phi+\theta), \quad \frac{d\phi}{dt} = \frac{v}{R}\cos(\phi+\theta) + \omega$$

In this case, the actual scan velocity is:

$$v_a = (v\cos\theta + \omega R\cos\phi)\hat{i} + (v\sin\theta - \omega R\sin\phi)\hat{j}$$

and the velocity compensation needed for perfect correction is:

$$v_x = -\omega R\cos\phi, v_y = \omega R\sin\phi$$

According to some embodiments, the appropriate pre-compensation may be achieved by feeding back $v_x$ and $v_y$ to the appropriate mirror galvanometers. According to other embodiments, the system may approximately pre-compensate along a polyline with variable velocity segments or along a straight line (e.g., which may be appropriate for relatively small travels).

Figure 10:
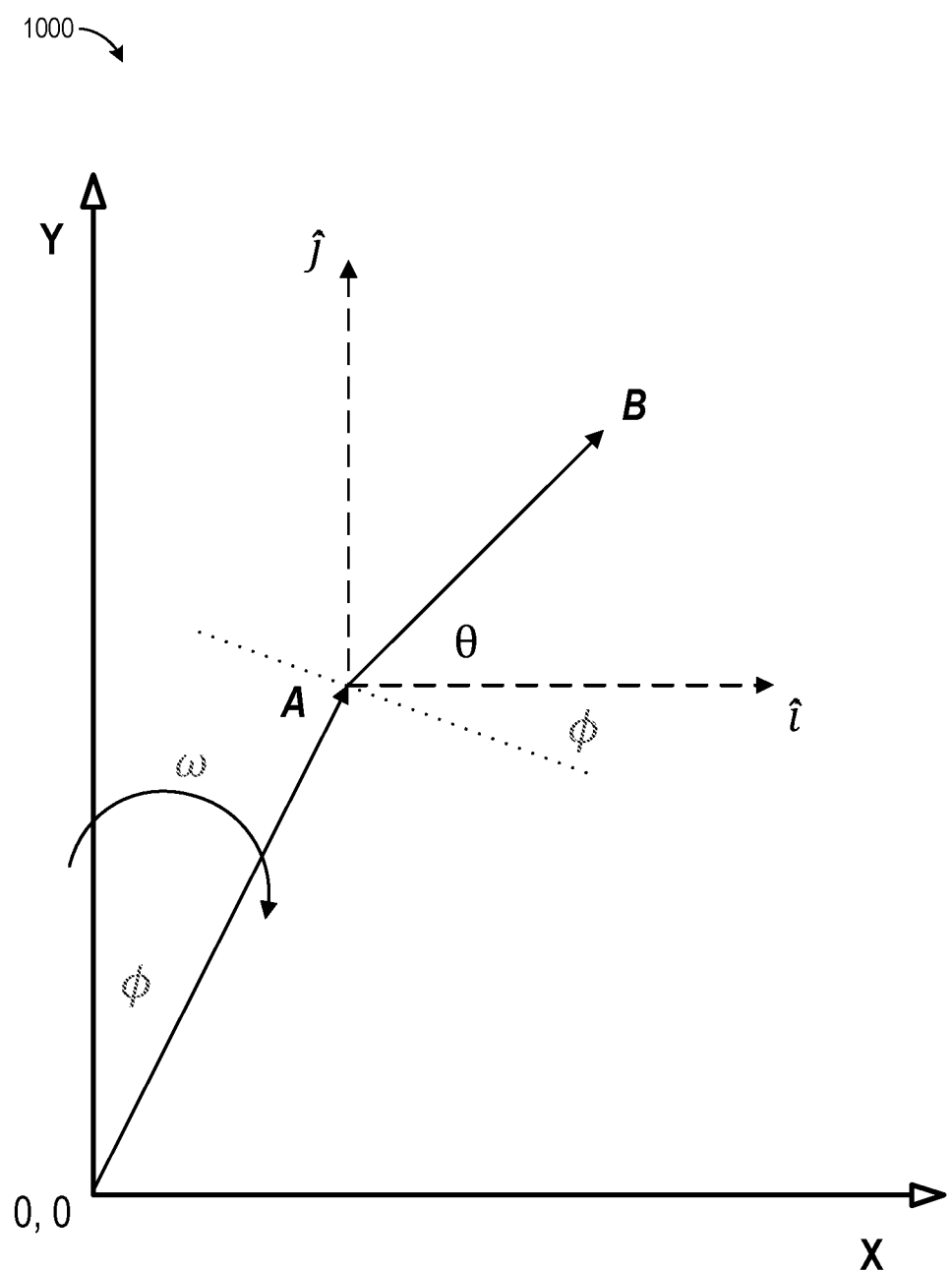
FIG. 10 illustrates two-point and multi-point compensation according to some embodiments.

FIG. 10 illustrates 1000 two-point and multi-point compensation according to some embodiments. In this case, A represents an instantaneous spot position, AB is an intended scan line, and θ is the intended hatch angle. Considering the scan line to be on a moving conveyor belt with velocity $$\vec{v_c} = \omega \frac{R_1 + R_2}{2}(\cos\phi\,\hat{i} - \sin\phi\,\hat{j}),$$

the compensated scan speed may be represented as $v' = \sqrt{v_x^2 + v_y^2}$, where $v_x = v\cos\theta - v_c\cos\phi$, $v_y = v\sin\theta + v_c\sin\phi$. Moreover, the compensated hatch angle would be represented by $$\theta' = \tan^{-1}\frac{v_y}{v_x}.$$

Note that for multi-point point compensation, the intended line could be broken into a desired number of segments. Appropriate two-point compensation might then be applied to each segment (resulting in a variable velocity polyline for each hatch). According to some embodiments, an error tolerance may determine the appropriate number of segments. Such a multi-point compensation method might, for example, improve performance if a mirror galvanometer is relatively fast and ω is reasonably constant (which may provide for a simple control architecture).

Note that hatch patterns need not be a set of parallel scan lines. According to some embodiments, the compensation methods described herein are extendable to hatch patterns where the system defines a seed point and generates function(s) for each frame (e.g., the generated function(s) may potentially be same for all frames) instead of defining a set of scan vectors. Also note that two-point compensation may provide appropriate trajectories for a three-dimensional printer that scans while moving (e.g., which may increase throughput because the idle time of laser would be significantly minimized.) Moreover, two-point compensation combined with frames that have boundaries parallel to hatch directions may reduce seams at grid boundaries (e.g., when frames are shaped like a parallelogram).

Figure 11:
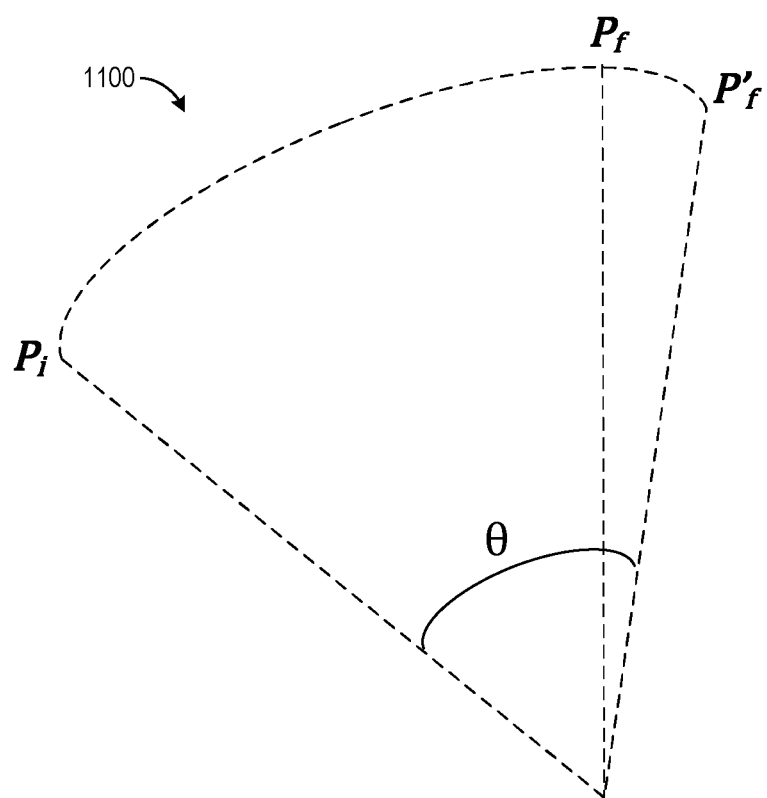
FIG. 11 illustrates error sensitivity to $\omega$ for pre-compensated paths.

The pre-compensation approaches described with respect to FIGS. 4 through 10 may have disadvantages. For example, applying the correct pre-compensation may be relatively sensitive to variation in rotational speed. In addition, when compensating higher rotational speeds (ω), mirror galvanometer dynamics may limit the accuracy of the system unless access to firmware can be achieved. That is, the positional error may increase as the length of a scan is increases (and as the variation in ω increases) with both two-point and multi-point compensation methods. For example, FIG. 11 illustrates 1100 error sensitivity to ω for pre-compensated paths. In this illustration 1100, $P_i$ is an initial position of a point, $P_f$ is a predicted position of the point after time t assuming rotational speed ω, and $P'_f$ is the actual position of the point after time t for rotational speed ω(1+n). Note that θ=ωt(1+n) and the positional error may be represented by:

$$\epsilon = R\sqrt{2(1-\cos(n\omega t))} = R\sqrt{2\left(1-\cos\frac{n}{1+n}\theta\right)}$$

Figure 12:
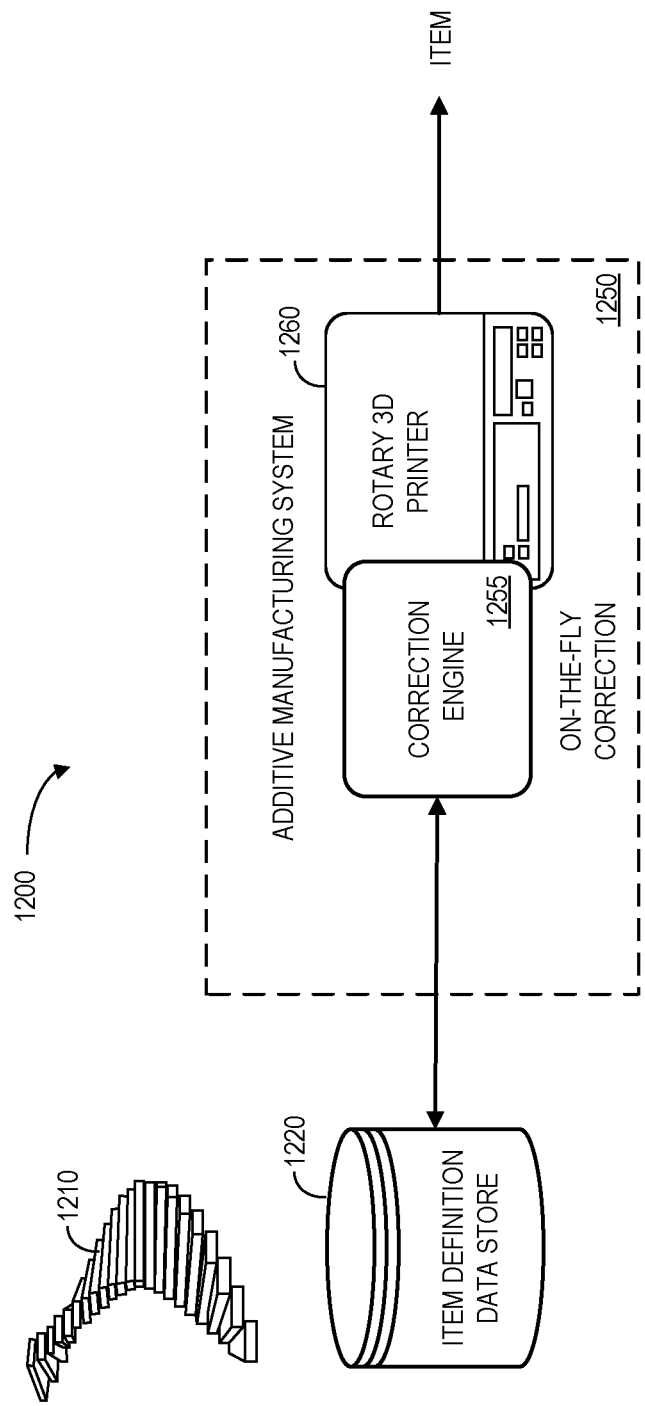
FIG. 12 is a high-level diagram of a system that may utilize a motion sensor when applying a correction according to some embodiments.

To address such issues, one or more motion sensors might measure movement of a built plate and/or print are as an item is being printed and that information may be used to correct the motion (instead of performing a pre-compensation before printing begins). For example, FIG. 12 is a high-level diagram of a system 1200 that may utilize a motion sensor when applying a correction according to some embodiments. As before, the system 1200 includes an additive manufacturing system 1250 that executes a correction engine 1255 that receives motion data from a rotary three-dimensional printer 1260 as an item is being created. According to some embodiments, the correction engine 1255 can access an item definition data store 1220 that includes electronic records defining an industrial asset item (e.g., CAD files). According to some embodiments, an automated correction engine 1255 may access and utilize frames 1210 defining an industrial asset item that may then be adjusted "on-the-fly" as the printer 1260 is creating the item.

Figure 13:
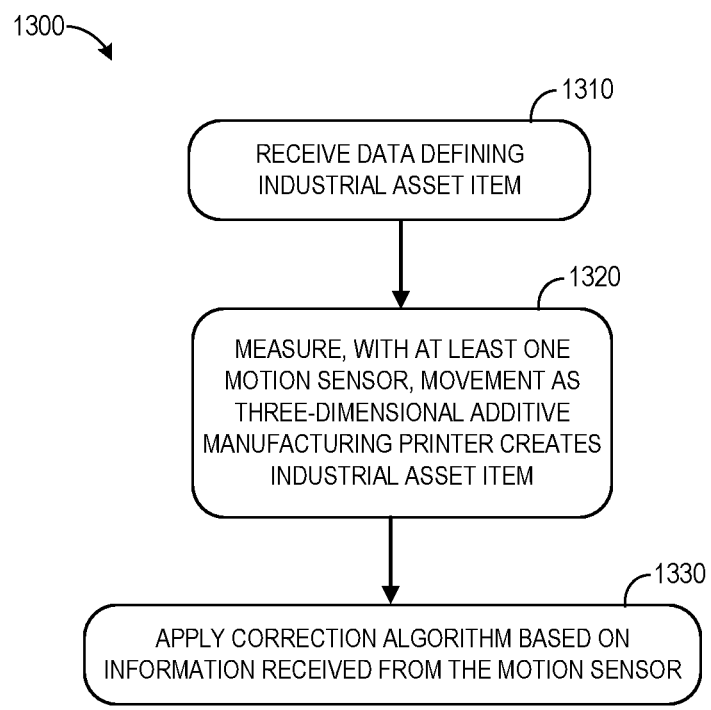
FIG. 13 is a method that may utilize a motion sensor when applying a correction for an additive manufacturing system in accordance with some embodiments.
Figure 14:
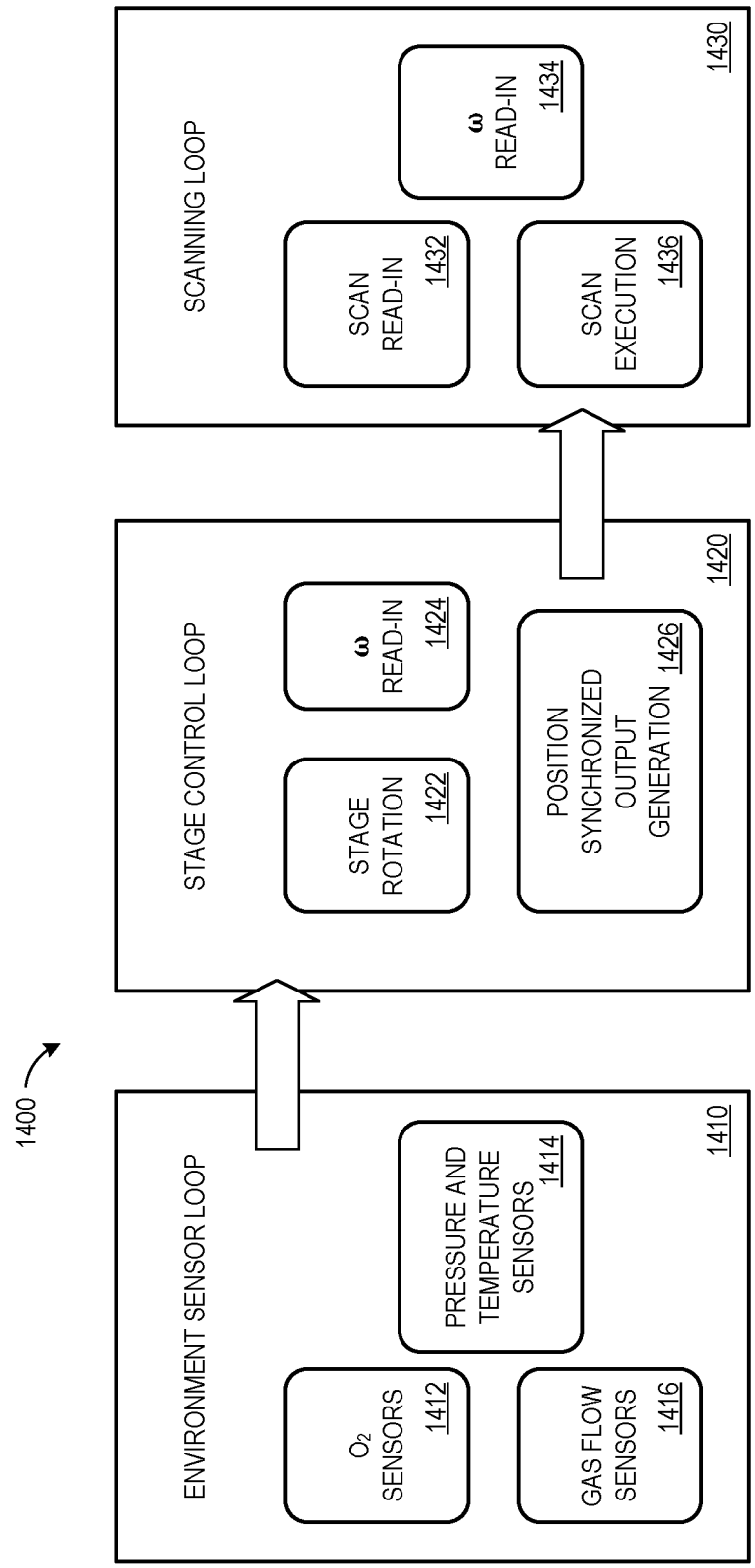
FIG. 14 is a supervisory control flow according to some embodiments.

Note that the system 1200 of FIG. 12 is provided only as an example, and embodiments may be associated with additional elements or components. According to some embodiments, the elements of the system 1200 automatically facilitate creation of an item via a rotary additive manufacturing process (e.g., such that a build plate rotates about a vertical axis and moves, relative to a print arm, along the vertical axis during printing) by applying on-the-fly correction to the motion between the build plate and print arm. For example, FIG. 13 illustrates a method 1300 that may utilize a motion sensor when applying a correction for an additive manufacturing system in accordance with some embodiments. At 1310, the system may receive data defining an industrial asset item. According to this embodiment, at least one motion sensor measures movement as a three-dimensional additive manufacturing printer creates an industrial asset item at 1320. At 1330, a correction engine may apply a correction algorithm based on information received from the motion sensor. For example, the correction algorithm might be associated with a supervisory control flow including an environment sensor loop, a stage control loop, and a scanning loop. For example, FIG. 14 is a supervisory control flow 1400 according to some embodiments. The flow 1400 includes an environmental sensor loop 1410 include oxygen ($O_2$) sensors 1412, pressure and temperature sensors 1414, and gas flow sensors 1416. Information from the environmental sensor loop 1410 (e.g., data to set and/or reset environment flags) may be provided to a stage control loop 1420 associated with stage rotation 1422, rotations speed ($\omega$) read-in 1424, and position synchronized output generation 1426. For example, the stage control loop may provide a position synchronized interrupt to a scanning loop 1430 that is associated with a scan read-in 1432, rotational speed ($\omega$) read-in 1434, and scan execution 1436 (e.g., to create the item in accordance with an appropriately corrected scan path).

Figure 15:
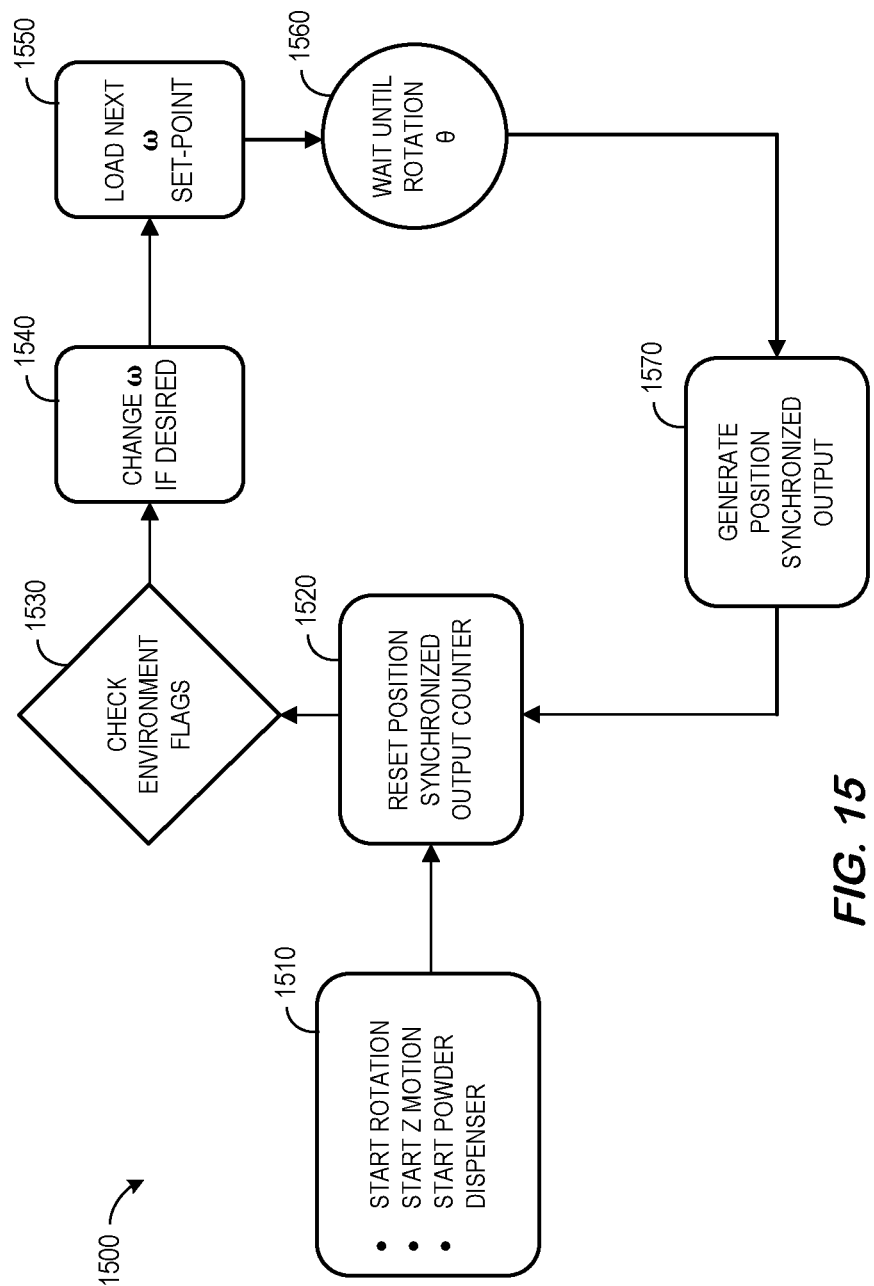
FIG. 15 is a state machine diagram associated with a finite state machine in accordance with some embodiments.

According to some embodiments, a correction algorithm based on information from a motion sensor is associated with a finite state machine that generates a position synchronized output. For example, FIG. 15 is a state machine diagram 1500 associated with a finite state machine in accordance with some embodiments. The system may begin by initiating build plate rotation, Z axis motion, and powder dispensing 1510. A position synchronized output counter may be reset at 1520 and environmental flags may be checked at 1530. Depending on the environmental flags, the rotational speed ($\omega$) may be changed at 1540 if desired. The next $\omega$ set-point may then be loaded at 1550 and the system may wait until rotation of $\theta$ is achieved at 1560. When appropriate, the system may generate a position synchronized output at 1570 and the build process may continue at 1520.

Figure 16:
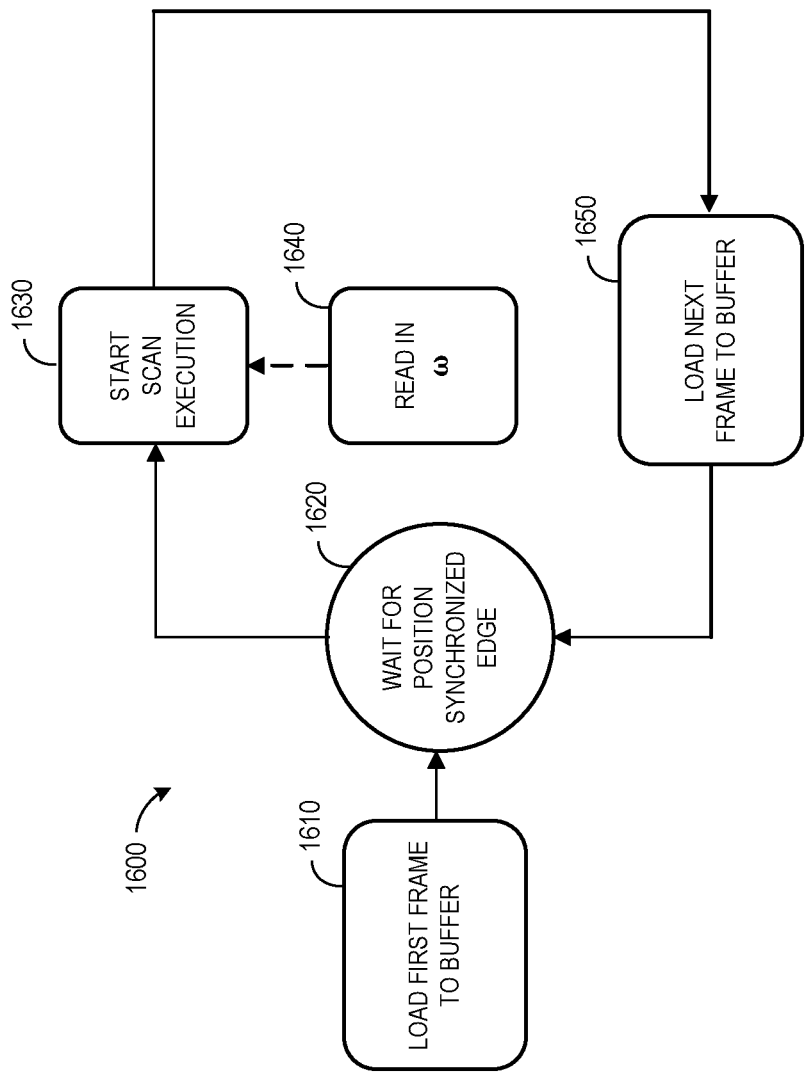
FIG. 16 is a state machine diagram associated with a scan finite state machine according to some embodiments.

According to some embodiments, a correction algorithm based on information from a motion sensor is executed on a frame-by-frame basis as frames are loaded into a buffer of the three-dimensional printer. For example, FIG. 16 is a state machine diagram 1600 associated with a scan finite state machine according to some embodiments. At 1610, a first frame may be loaded into a buffer and the system may wait for a position synchronized output edge to occur at 1620. When the position synchronized output occurs, scan execution begins at 1630 (at which point rotational speed ($\omega$) may be read-in at 1640 according to some embodiments). The system may then load the next frame into the bugger at 1650 and the build process may continue at 1620.

Figure 17:
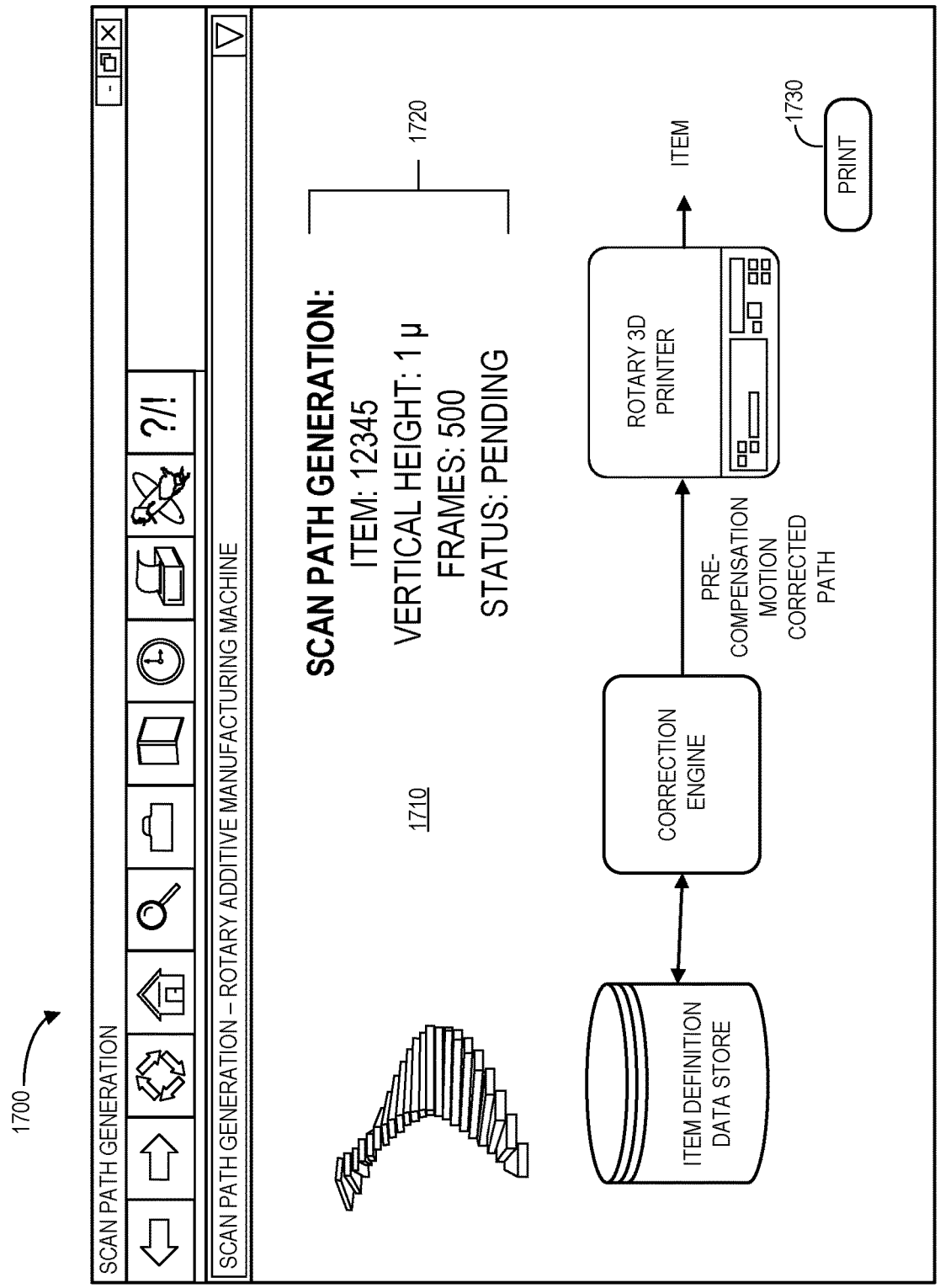
FIG. 17 illustrates a display in accordance with some embodiments.

Note that an operator or administrator may monitor and/or adjust operation of a correction engine associated with an additive manufacturing process, and FIG. 17 illustrates a display 1700 in accordance with such embodiments. The display 1700 may include an interactive user interface 1710 that graphically displays the status of various elements in a scan path generation and correction system. According to some embodiments, selection of one or more elements 1720 in the display 1700 may result in the appearance of more detailed information about the system, allow an operator to make parameter adjustments, etc. According to some embodiments, selection of an icon 1730 (e.g. via a computer mouse) may initiating a scan correction process, a printing operation, etc.

Figure 18:
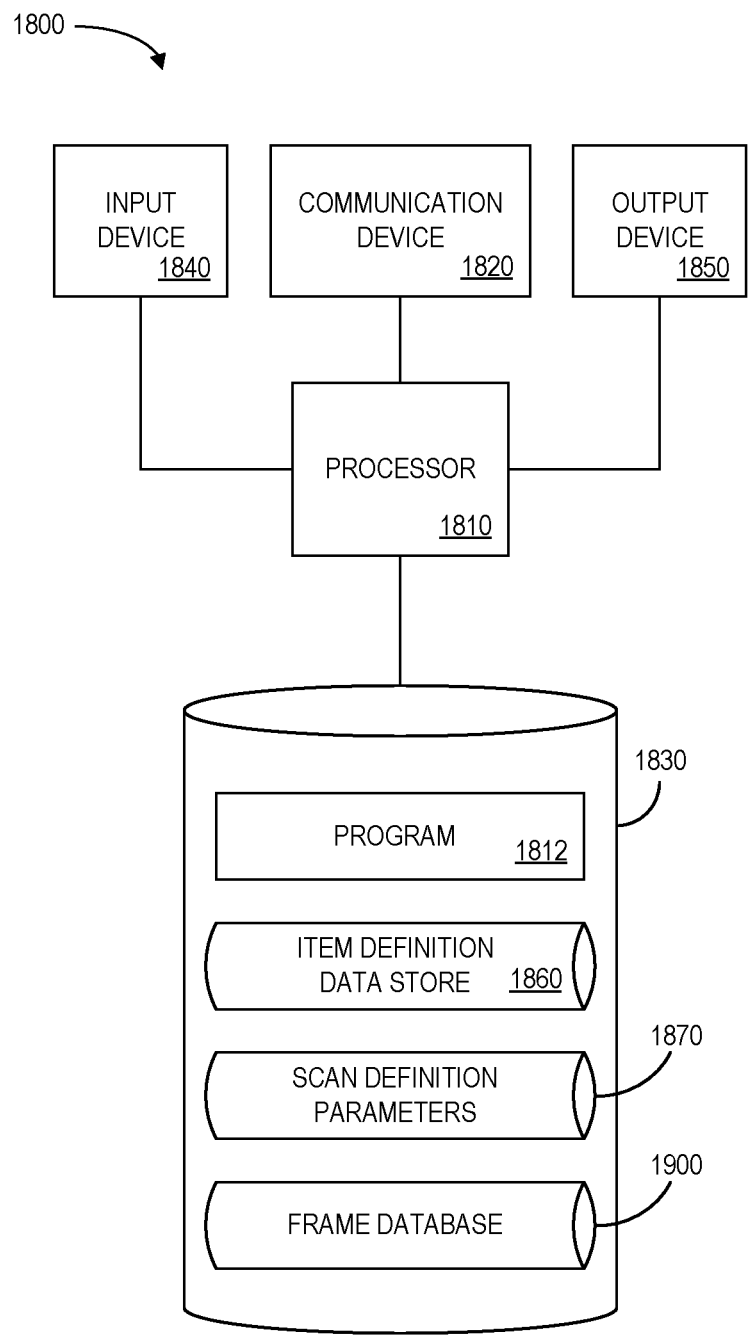
FIG. 18 illustrates a platform according to some embodiments.

Embodiments described herein may comprise a tool that facilitates creation of an industrial asset item via an additive manufacturing process and may be implemented using any number of different hardware configurations. For example, FIG. 18 illustrates a platform 1800 that may be, for example, associated with the systems 200, 400, 1200 of FIGS. 2, 4, 12 respectively (as well as other systems described herein). The platform 1800 comprises a processor 1710, such as one or more commercially available Central Processing Units ("CPUs") in the form of one-chip microprocessors, coupled to a communication device 1820 configured to communicate via a communication network (not shown in FIG. 18). The communication device 1820 may be used to communicate, for example, with one or more remote item definition data stores, three-dimensional printers, etc. Note that communications exchanged via the communication device 1820 may utilize security features, such as those between a public internet user and an internal network of a printing enterprise. The security features might be associated with, for example, web servers, firewalls, and/or PCI infrastructure. The platform 1800 further includes an input device 1840 (e.g., a mouse and/or keyboard to enter information about a design file, an industrial asset item, etc.) and an output device 1850 (e.g., to output design reports, generate corrected scan paths, etc.).

The processor 1810 also communicates with a storage device 1830. The storage device 1830 may comprise any appropriate information storage device, including combinations of magnetic storage devices (e.g., a hard disk drive), optical storage devices, mobile telephones, and/or semiconductor memory devices. The storage device 1830 stores a program 1812 and/or network security service tool or application for controlling the processor 1810. The processor 1810 performs instructions of the program 1812, and thereby operates in accordance with any of the embodiments described herein. For example, the processor 1810 may receive, from an industrial asset item definition data store 1860 containing at least one electronic record defining an industrial asset item, data defining the industrial asset item. The processor 1810 may then correct the motion provided between the build plate and the print arm such that the motion deviates from a path indicated by the data defining the industrial asset item. The three-dimension printer may be a rotary printer such that the build plate rotates about a vertical axis and moves along the vertical axis during printing. In these cases, the processor 1810 may apply a pre-compensation algorithm to correct the motion provided between the build plate and the print arm before transmitting data to the three-dimensional additive manufacturing printer.

The program 1812 may be stored in a compressed, uncompiled and/or encrypted format. The program 1812 may furthermore include other program elements, such as an operating system, a database management system, and/or device drivers used by the processor 1810 to interface with peripheral devices.

As used herein, information may be "received" by or "transmitted" to, for example: (i) the platform 1800 from another device; or (ii) a software application or module within the platform 1800 from another software application, module, or any other source.

In some embodiments (such as shown in FIG. 18), the storage device 1830 further stores the item definition data store 1860, scan definition parameters 1870 (e.g., operator preferences, printer capabilities, etc.), and a frame database 1900. An example of a database that might be used in connection with the platform 1800 will now be described in detail with respect to FIG. 19. Note that the database described herein is only an example, and additional and/or different information may be stored therein. Moreover, various databases might be split or combined in accordance with any of the embodiments described herein. For example, the item definition data store 1860 and/or frame database 1900 might be combined and/or linked to each other within the program 1812.

Referring to FIG. 19, a table is shown that represents the frame database 1900 that may be stored at the platform 1800 in accordance with some embodiments. The table may include, for example, entries identifying designs that have been created for industrial asset items. The table may also define fields 1902, 1904, 1906, 1908, 1910, 1912 for each of the entries. The fields 1902, 1904, 1906, 1908, 1910, 1912 may, according to some embodiments, specify: a design identifier 1902, an item description 1904, a frame identifier 1906, a height 1908, an angular width 1910, and a corrected scan path 1912. The frame database 1900 may be created and updated, for example, based on information electrically received from an operator, a rotary additive printing platform, a frame creation engine, etc.

The design identifier 1902 may be, for example, a unique alphanumeric code identifying an industrial asset as indicated by the item description 1904. The frame identifier 1906 may identify each of a series of frames that comprise a spiral staircase representation of the item. The height 1908 might represent a vertical or z height of each step in the staircase and the angular width 1910 might define the area associated with the frame. The corrected scan path 1912 might define how the print arm or laser should be moved during printing (e.g., including hatch angles, part geometries, etc.) and may include pre-compensation and/or on-the-fly corrections.

Thus, some embodiments described herein may provide technical advantages, including the ability to reduce errors caused by motion during an additive manufacturing printing process (e.g., by applying either pre-compensation or on-the-fly corrective algorithms).

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 20:
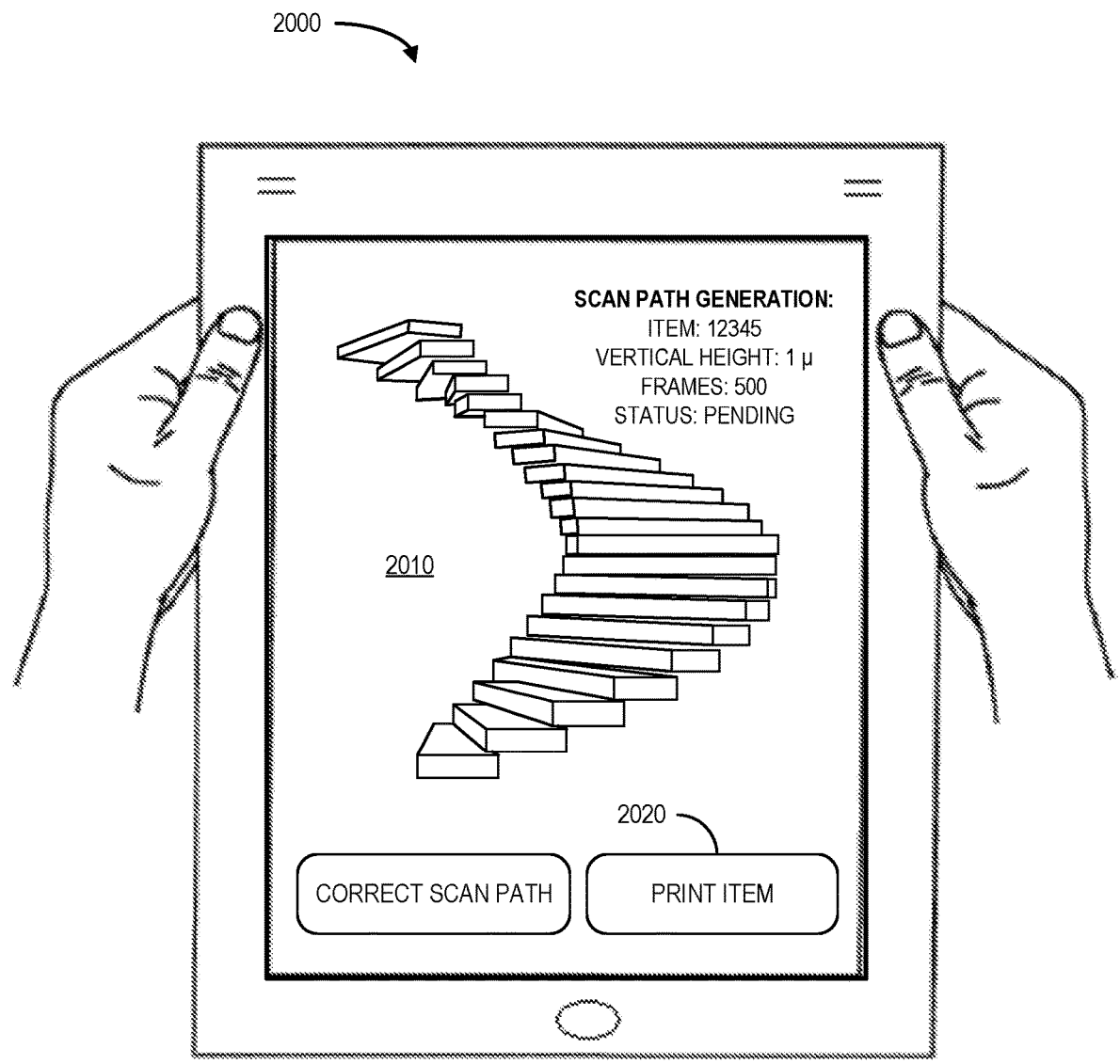
FIG. 20 illustrates a tablet computer providing a display according to some embodiments.

Although specific hardware and data configurations have been described herein, note that any number of other configurations may be provided in accordance with embodiments of the present invention (e.g., some of the information described herein may be combined or stored in external systems). Moreover, the displays shown and described herein are provided only as examples, and other types of displays and display devices may support any of the embodiments. For example, FIG. 20 illustrates a tablet computer 2000 with a scan path generation display 2010 that might utilize a graphical user interface. The display 2010 might include a depiction of a series of frames that have been automatically generated (including pre-compensation and/or on-the-fly motion corrections) for an industrial asset item. Note that selection of an element on the display 2010 might result in a display of further information about that element. Moreover, the display 2010 might comprise an interactive user interface (e.g., via a touchscreen) and includes "correct scan path" and "print item" 2020 icons in accordance with any of the embodiments described herein.

Some embodiments have been described with respect to the creation of an "industrial asset item," which might be, for example, an engine part, a generator component, etc. Note, however, that as used herein the phrase "industrial asset item" might refer to any other type of item, including: consumer electronics parts, toys, household goods, automotive parts, etc. In general, embodiments may address the challenges creating scan paths for additive manufacturing machines.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system to facilitate creation of an industrial asset item via an additive manufacturing process wherein motion is provided between a build plate and a print arm, comprising:
   an industrial asset item definition data store containing at least one electronic record defining the industrial asset item; and
   a correction engine associated with a three-dimensional additive manufacturing printer, wherein the three-dimensional additive manufacturing printer is a rotary printer, the correction engine including:
      a communication port to receive data defining the industrial asset item, and
      a correction engine computer processor coupled to the communication port, wherein the correction engine computer processor is adapted to:
         receive information from at least one motion sensor configured to measure movement as the three-dimensional additive manufacturing printer creates the industrial asset item; and
         correct the motion provided between the build plate and the print arm by applying a correction algorithm based on the information received from the at least one motions sensor such that the motion deviates from a path indicated by the data defining the industrial asset item based on a known rotary movement characteristics of a particular three-dimensional printing technique, the known rotary movement characteristics comprising at least a rotational speed provided between the build plate and the print arm.

2. The system of claim 1, wherein the build plate is moved relative to the print head which remains stationary or the print head is moved relative to the build plate which remains stationary.

3. The system of claim 1, wherein both the print head and the build plate are moved relative to each other.

4. The system of claim 1, wherein the build plate rotates about a vertical axis and moves, relative to the print arm, along the vertical axis during printing.

5. The system of claim 1, wherein the correction engine applies at least one pre-compensation algorithm to correct the motion provided between the build plate and the print arm before transmitting data to the three-dimensional additive manufacturing printer.

6. The system of claim 5, wherein the pre-compensation algorithm is associated with at least one of: (i) an intended scan velocity, (ii) motion of an instantaneous laser spot position, (iii) an actual scan velocity, and (iv) a velocity compensation.

7. The system of claim 5, wherein the pre-compensation algorithm provides multi-point compensation resulting in a variable velocity polyline for an individual hatch.

8. The system of claim 1, wherein the correction algorithm is associated with a supervisory control flow including an environment sensor loop, a stage control loop, and a scanning loop.

9. The system of claim 1, wherein the correction algorithm is associated with a finite state machine that generates a position synchronized output.

10. The system of claim 1, wherein the correction algorithm is executed on a frame-by-frame basis as frames are loaded into a buffer of the three-dimensional printer.

11. The system of claim 1, wherein the data defining the industrial asset item is sliced to create a series of two-dimensional, locally linear frames helically arranged as a spiral staircase of steps, wherein each step is oriented normal to the vertical axis.

12. The system of claim 11, wherein the rotary three-dimensional printer has two or more print arms and a first series of two-dimensional frames are created for one print arm and a second series of two-dimensional frames are created for another print arm, wherein the first and second series are arranged as intertwined spiral staircases.

13. The system of claim 11, wherein the rotary three-dimensional printer is associated with a working scan field, and at least one frame is created based on the working scan field.

14. The system of claim 1, wherein the three-dimensional printer is associated with a Direct Metal Laser Melting ("DMLM") process.

15. The system of claim 1, wherein the at least one electronic record defining the industrial asset item is associated with at least one of: (i) an image, (ii) a manufactured design, (iii) a cross-section, (iv) a binary Computer Aided Design ("CAD") file, and (v) a geometry file.

16. The system of claim 1, wherein the provided motions are linear and at least one of the linear motions is damped such that an associated position over time is generally sinusoidal.

17. A computer-implemented method to facilitate creation of an industrial asset item via an additive manufacturing process for a rotary, three-dimensional printer, wherein motion is provided between a build plate and a print arm, the method comprising:

receiving, at a correction engine from an industrial asset item definition data store containing at least one electronic record defining the industrial asset item, the data defining the industrial asset item;

receiving, at the correction engine, information from at least one motion sensor configured to measure movement as the three-dimensional additive manufacturing printer creates the industrial asset item; and correcting, by a correction engine computer processor, the motion provided between the build plate and the print arm by applying a correction algorithm based on the information received from the at least one motions sensor such that the motion deviates from a path indicated by the data defining the industrial asset item based on a known rotary movement characteristics of a particular three-dimensional printing technique, the known rotary movement characteristics comprising at least a rotational speed provided between the build plate and the print arm.

18. The method of claim 17, wherein the build plate rotates about a vertical axis and moves, relative to the print arm, along the vertical axis during printing.

19. The method of claim 17, wherein the correction engine applies at least one pre-compensation algorithm to correct the motion provided between the build plate and the print arm before transmitting data to the three-dimensional additive manufacturing printer.

20. A non-transitory, computer-readable medium storing instructions that, when executed by a computer processor, cause the computer processor to perform a method to facilitate creation of an industrial asset item via an additive manufacturing process for a rotary, three-dimensional printer, wherein motion is provided between a build plate and a print arm, the method comprising:

receiving, at a correction engine from an industrial asset item definition data store containing at least one electronic record defining the industrial asset item, the data defining the industrial asset item;

receiving, at the correction engine, information from at least one motion sensor configured to measure movement as the three-dimensional additive manufacturing printer creates the industrial asset item; and correcting, by a correction engine computer processor, the motion provided between the build plate and the print arm by applying a correction algorithm based on the information received from the at least one motions sensor and on a known rotary movement characteristics of a particular three-dimensional printing technique such that the motion deviates from a path indicated by the data defining the industrial asset item, the known rotary movement characteristics comprising at least a rotational speed provided between the build plate and the print arm.

21. The medium of claim 20, wherein the build plate rotates about a vertical axis and moves, relative to the print arm, along the vertical axis during printing and the correction engine computer processor applies at least one pre-compensation algorithm to correct the motion provided between the build plate and the print arm before transmitting data to the three-dimensional additive manufacturing printer.

* * * * *